United States Patent
Elliott

(10) Patent No.: US 10,129,388 B1
(45) Date of Patent: Nov. 13, 2018

(54) SYSTEMS AND METHODS FOR RESTRICTING OPERATION OF A MOBILE DEVICE WHILE OPERATING A VEHICLE

(71) Applicant: Verizon Patent and Licensing Inc., Arlington, VA (US)

(72) Inventor: Herman Bryant Elliott, Marietta, GA (US)

(73) Assignee: Verizon Patent and Licensing Inc., Basker Ridge, NJ (US)

(*) Notice: Subject to any disclaimer, the term of this patent is extended or adjusted under 35 U.S.C. 154(b) by 0 days.

(21) Appl. No.: 15/583,158

(22) Filed: May 1, 2017

(51) Int. Cl.
   H04M 3/00 (2006.01)
   H04M 1/725 (2006.01)
   H04W 4/04 (2009.01)
   H04W 4/80 (2018.01)

(52) U.S. Cl.
   CPC ....... *H04M 1/72577* (2013.01); *H04W 4/046* (2013.01); *H04W 4/80* (2018.02)

(58) Field of Classification Search
   CPC .................................................. H04M 1/72577
   USPC ........................................................ 455/418
   See application file for complete search history.

(56) References Cited

U.S. PATENT DOCUMENTS

| | | | | |
|---|---|---|---|---|
| 2010/0202430 A1* | 8/2010 | Chin | ..................... | H04W 68/12 370/342 |
| 2012/0268235 A1* | 10/2012 | Farhan | ..................... | G05B 9/02 340/3.1 |
| 2013/0090106 A1* | 4/2013 | Mathews | ................ | H04W 4/06 455/418 |
| 2015/0109612 A1* | 4/2015 | Ellison-Marion | ....... | G01S 17/48 356/72 |
| 2017/0303090 A1* | 10/2017 | Stitt | ...................... | H04W 4/025 |

* cited by examiner

*Primary Examiner* — Joshua Schwartz

(57) ABSTRACT

A method may include receiving, by a mobile device, signals periodically output by a plurality of beacon devices, wherein the beacon devices are positioned at known locations within a motor vehicle interior. The mobile device also receives vehicle operating condition information from a vehicle interface device operatively coupled to one or more electronic systems of the motor vehicle. The mobile device determines a position of the mobile device within the motor vehicle interior based on the received signals and determines whether a user of the mobile device is a driver of the motor vehicle based on the position of the mobile device and the vehicle operating condition information. When it is determined that the user of the mobile device is the driver of the motor vehicle, the mobile device restricts one or more features of the mobile device.

19 Claims, 6 Drawing Sheets

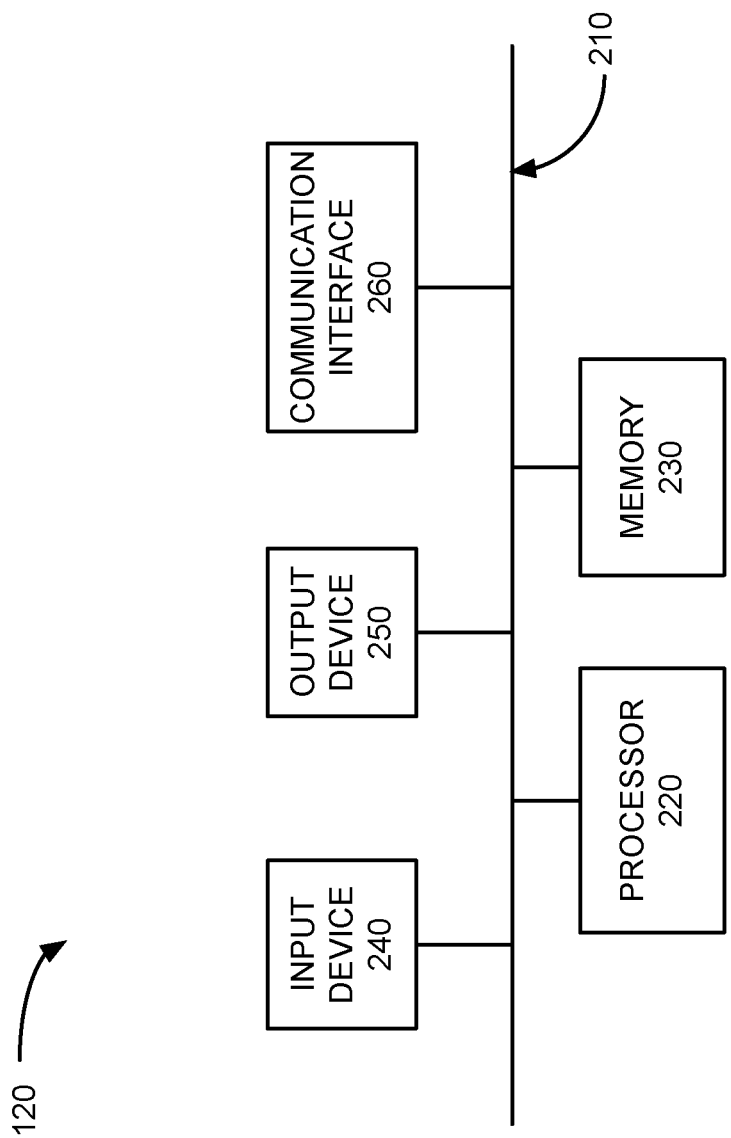

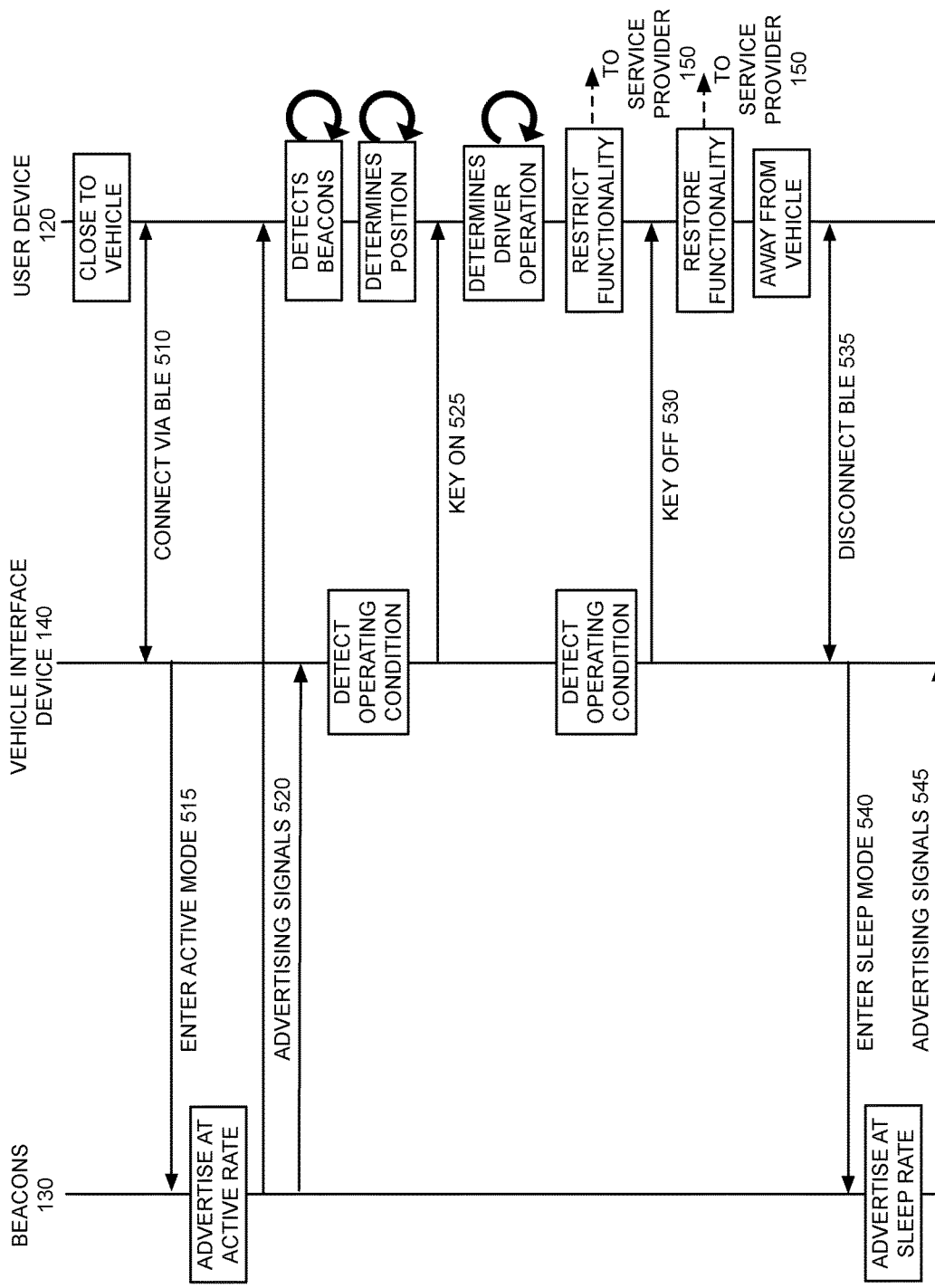

ns implemented in the beacons of FIG. 1;

SYSTEMS AND METHODS FOR RESTRICTING OPERATION OF A MOBILE DEVICE WHILE OPERATING A VEHICLE

BACKGROUND

With increasing ubiquity of smart phones and other connected devices, distracted driving has become a significant if not predominant cause of vehicle accidents. Although drivers almost universally acknowledge that distracted driving is dangerous, the temptation to address a device alert or message is often difficult to resist. Current methods for addressing this issue generally revolve around driver education and public service messages, since to date there is no effective and reliable technical solution.

BRIEF DESCRIPTION OF THE DRAWINGS

FIG. 2a illustrates an exemplary configuration of components implemented in the user device of FIG. 1;

FIG. 5 is a signal flow diagram associated with the processing of FIG. 4.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to determining driver device use and modifying device capabilities based on the determination. In an exemplary implementation, a plurality of beacon or transmitter devices may be positioned within the passenger compartment of a motor vehicle. A vehicle system interface device may be coupled to the vehicle. A vehicle interface application executing on a user device may receive signals from the beacon devices as well as the vehicle system interface device to determine both a location of the user device and an operating condition of the vehicle. When the vehicle interface application determines that the user device is likely being operated by a driver of the vehicle, and when it is determined that the vehicle is in an operating state other than stationary, activities available to the user device may be restricted in a manner that promotes undistracted driving.

Figure 1:
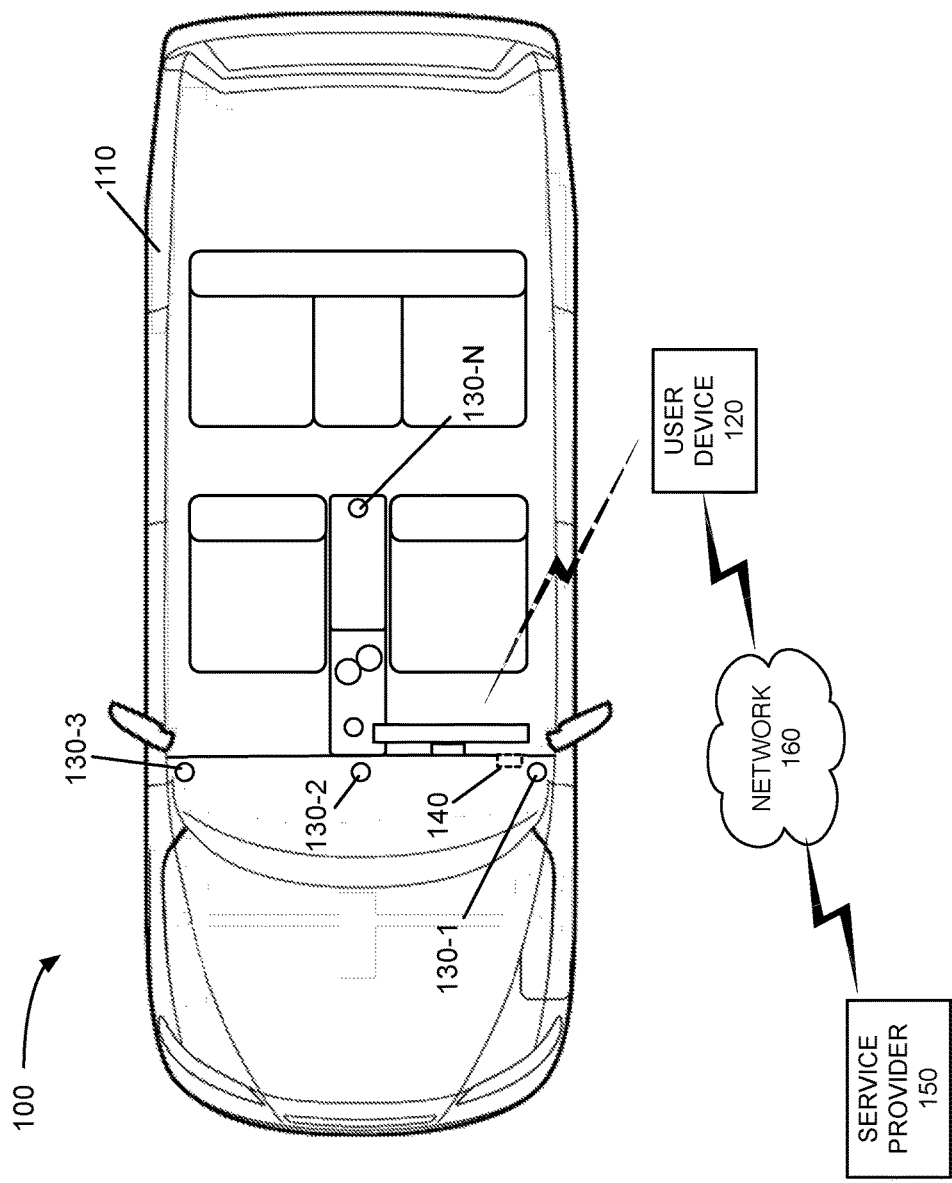
FIG. 1 illustrates an exemplary environment in which systems and methods described herein may be implemented.

FIG. 1 is a block diagram of an exemplary environment 100 in which systems and methods described herein may be implemented. Environment 100 includes vehicle 110, user device 120, a plurality of beacon devices 130-1 to 130-N (referred to collectively as "beacons 130" and individual as "beacon 130"), vehicle interface device 140, service provider 150, and network 160.

Vehicle 110 may represent any vehicle, such as a car, truck, bus, recreational vehicle, motorcycle, farm equipment, boat, etc.

User device 120 may include a mobile device, such as wireless or cellular telephone device, a smart phone, etc. In another implementation, user device 120 may include any type of mobile computer device or system, such as a personal computer (PC), a laptop, a tablet computer, a notebook, a netbook, a wearable computer (e.g., a wrist watch, fitness band, eyeglasses, etc.), a game playing device, a music playing device, etc., that may include communication functionality. User device 120 may connect to devices in environment 100 (e.g., beacons 130, vehicle interface device 140, etc.) via any conventional technique, such as wired, wireless, optical connections or a combination of these techniques. User device 120 and the person associated with user device 120 (e.g., the party holding or using user device 120) may be referred to collectively as user device 120 in the description below.

Beacons 130 may include an electronic device to transmit one or more signals for receipt by user device 120 and/or vehicle interface device 140. In one implementation, beacons 130 may include a compact form factor (e.g., less than approximately 20.0 cm$^3$ in volume) that includes a transmitter for broadcasting a predetermined signal at periodic intervals and a battery for powering the transmitter. Consistent with embodiments described herein, beacons 130 may transmit using a known wireless technology, such as Bluetooth low energy (BLE). In one embodiment, the signals transmitted by each beacon 130 include a value for a universally unique identifier (UUID) associated with the beacon 130 as well as a value for the received signal strength indicator (RSSI) of the beacon 130. The RSSI for each beacon 130 is determined or calibrated by its manufacturer and is based on a measurement of the transmitting signal strength of the beacon at a known distance, typically one meter. As described below, user device 120 may observe the signals output by each beacon 130 including the measured signal strength for each beacon 130 and may calculate an approximate relative position of the user device 120 within the vehicle based on the RSSI values received from beacons 130 and the measured signal strength values.

In one exemplary implementation, beacons 130 may include a transceiver that enables bidirectional communication (in contrast with a one-way transmitter). As described below, beacons 130 may include two distinct operational modes, a quiescent or sleep mode and an active mode. In response to receipt of a signal from vehicle interface device 140 (or user device 120), beacons may transition from the sleep mode to the active mode and vice-versa. While in the sleep mode, beacons 130 may be configured to transmit advertising signals (e.g., the signal including the UUID and RSSI values) at a slow interval (e.g., on the order of approximately 1-2 seconds between signals). In contrast, while in the active mode, beacons 130 may transmit advertising signals at a much quicker rate (e.g., on the order of approximately 100 milliseconds (ms) between signals). Such an implementation substantially increases the operating lifespan of beacons 130, even when powered by low capacity batteries, such as coin cell batteries.

As depicted in FIG. 1, beacons 130 may be positioned at various locations within an interior of vehicle 110 to allow accurate location determination. Although the specific locations may be variable, in one implementation, it may be advantageous to provide at least three beacons 130 at positions underneath or on top of a dashboard in vehicle 110 and a fourth beacon placed rearwardly relative to the driver, such as within or behind a vehicle center console.

Vehicle interface device 140 may interface with one or more one or more vehicle electronic systems (VESs) located within vehicle 110. For example, vehicle interface device 140 may include vehicle diagnostics and tracking logic that interfaces with vehicle monitoring systems, such as the speedometer, odometer, braking system, onboard computer, etc. In one implementation, vehicle interface device 140 may include a dongle or other plug-in device that connects to a port on vehicle 110, such as an On-board Diagnostics (OBD)-II port, and includes diagnostic reader logic to obtain information regarding operation of vehicle 110, such as speed, location, etc. Vehicle interface device 140 may include a device installed in the vehicle 110 and capable of communicating with user device 120. For example, vehicle interface device 140 may include a wireless electronic device (e.g., a Bluetooth device) installed in the vehicle and capable of establishing a BLE wireless connection with user device 120.

While vehicle interface device 140 may include a removable device, in other implementations, vehicle interface device 140 may include a configurable component integrated or permanently installed within vehicle 110, such as a vehicle information and entertainment system.

In an exemplary implementation, user device 120 may receive data signals from beacons 130 and vehicle interface device 140 and may interpret the signals to determine both an operational state of vehicle 110 as well as the relative position of user device 120 within vehicle 110. In some implementations, user device 120 may include a software application configured to communicate with beacons 130, vehicle interface device 140, and/or service provider 150 to restrict functions or features of user device 120 when it is determined that the operator of user device 120 is the driver of vehicle 110 and that vehicle 110 is in an operating condition. For example, the software application may be configured to prevent or limit telephone calls or text messaging or to limit mobile application or data usage while a person associated with user device 120 is determined to be driving vehicle 110.

Service provider 150 may include one or more computing devices, such as a server device or a collection of server devices associated with a provider of wireless services to user device 120. Consistent with one or more embodiments described herein, service provider 150 may receive notifications or indications from user device 120 via network 160 when it is determined that user device 120 is being operated by a driver. In response, service provider 150 may restrict or reduce functionality of user device 120 until a notification is received indicating that the user device 120 is no longer being used by a driver. Such restrictions may include preventing telephone calls or text messages from being routed to user device 120, etc.

Network 160 may include a wireless network for providing voice and/or data services to user device 120. For example, network 160 may include one or more wireless networks and may include a number of transmission towers for receiving wireless signals and forwarding the wireless signals toward the intended destinations. Network 160 may further include one or more satellite networks, one or more packet switched networks, such as an Internet protocol (IP) based network, a local area network (LAN), a wide area network (WAN), a personal area network (PAN), a long term evolution (LTE) network, a Wi-Fi network, or another type of network that is capable of transmitting data.

Although BLE is described above, additional or alternative short range wireless interfaces may be used, for example, to facilitate the interface of user device 120 with beacons 130 and/or vehicle interface device 140. For example, wireless interfaces may include ZigBee, Wi-Fi, NFC (near field communication), etc. One or more of such wireless interfaces may be used to exchange credentials for verification, trigger processes on user device 120, etc.

The exemplary environment illustrated in FIG. 1 is provided for simplicity. It should be understood that a typical environment may include more or fewer devices than illustrated in FIG. 1. For example, environment 100 may include a different number and location of beacons 130 than shown in FIG. 1.

Various functions are described below as being performed by particular components in environment 100. In other implementations, various functions described as being performed by one device or component may be performed by another device or multiple other devices, and/or various functions described as being performed by multiple devices may be combined and performed by a single device.

FIG. 2a illustrates an exemplary configuration of user device 120. Other devices in environment 100, such vehicle interface device 140 and service provider 150 may be configured in a similar manner. Referring to FIG. 2a, user device 120 may include bus 210, processor 220, memory 230, input device 240, output device 250 and communication interface 260. Bus 210 may include a path that permits communication among the elements of user device 120.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, user device 120 may include a touch screen display may act as both an input device 240 and an output device 250.

Communication interface 260 may include one or more transceivers that user device 120 (or other elements in FIG. 1) uses to communicate with other devices via wired, wireless or optical mechanisms. For example, communication interface 260 may include one or more radio frequency (RF) transmitters, receivers and/or transceivers and one or more antennas for transmitting and receiving RF data. Communication interface 260 may also include a modem or an Ethernet interface to a LAN or other mechanisms for communicating with elements in a network. Communication interface 260 may further include BLE logic configured to communicate with beacons 130 and vehicle interface device 140, as described herein.

Figure 2B:
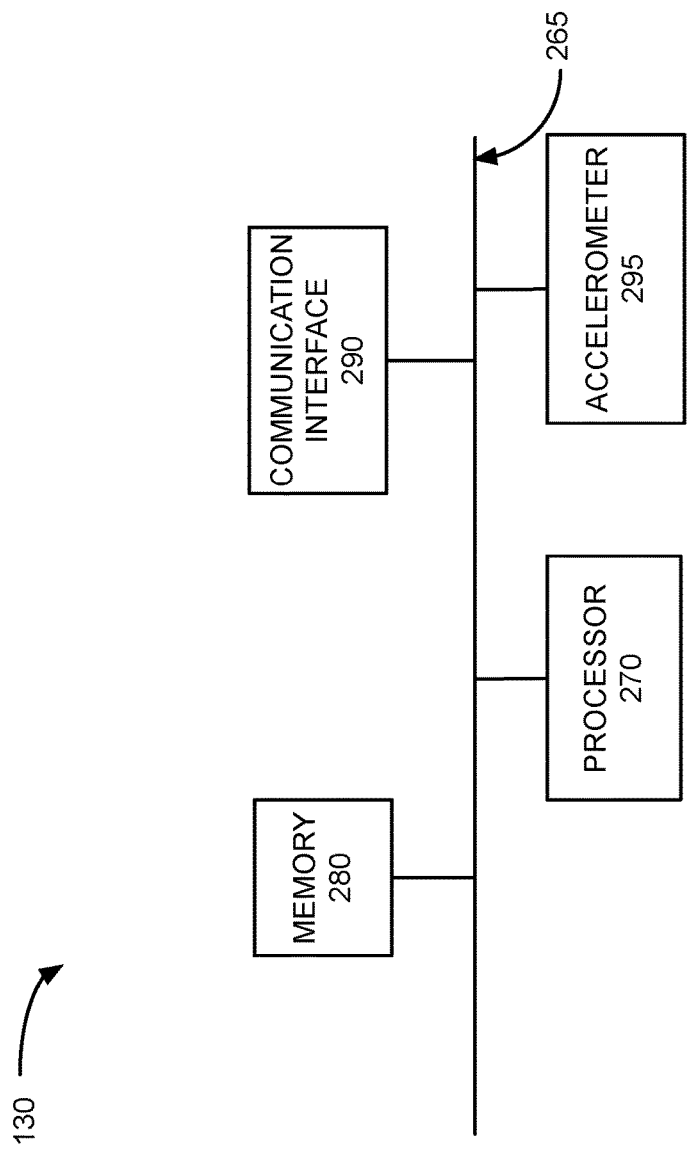
FIG. 2b illustrates an exemplary configuration of components implemented in the beacons of FIG. 1.

FIG. 2b illustrates an exemplary configuration of beacon 130. Referring to FIG. 2b, each beacon 130 may include a bus 265, processor 270, memory 280, communication interface 290, and may optionally include an accelerometer 295. Bus 210 may include a path that permits communication among the elements of beacon 130. Processor 270 may include one or more processors, microprocessors, or processing logic that may interpret and execute instructions. Memory 280 may include a random access memory (RAM)

or another type of dynamic storage device that may store information and instructions for execution by processor 270. Memory 280 may also include a storage device (e.g., flash memory, etc.) that may store static information and instructions for use by processor 270, such as identification and RSSI information, as described above.

Communication interface 290 may include one or more receivers or transceivers for communicating with user device 120 and/or vehicle interface device 140. For example, communication interface 290 may include BLE logic for transmitting advertising signals at predetermined intervals. In some embodiments, processor 270, memory 280, and communication interface 290 may be provided on a single chip (e.g., a system on a chip (SOC)).

Accelerometer 295 may include a device that measures reaction forces that are generated by acceleration and or gravity. Accelerometer 295 may be used to sense inclination, vibration, and/or shock. As described below, an output from accelerometer 295 may be included in the advertising signal output by beacons 130 and may be used to determine whether a beacon 130 has been tampered with or moved.

The exemplary configuration illustrated in FIGS. 2a and 2b are provided for simplicity. It should be understood that user device 120 or beacons 130 may include more or fewer devices than illustrated in FIGS. 2a and 2b. In an exemplary implementation, user device 120 (or other device in environment 100 or FIG. 2a) performs operations in response to processor 220 executing sequences of instructions contained in a computer-readable medium, such as memory 230. In addition, beacons 130 may perform operations in response to processor 270 executing sequences of instructions in a computer-readable medium, such as memory 280. A computer-readable medium may be defined as a physical or logical memory device. The software instructions may be read into memory 230/280 from another computer-readable medium (e.g., a SSD, etc.), or from another device via communication interface 260/290. Alternatively, hard-wired circuitry may be used in place of or in combination with software instructions to implement processes consistent with the implementations described herein. Thus, implementations described herein are not limited to any specific combination of hardware circuitry and software.

Figure 3:
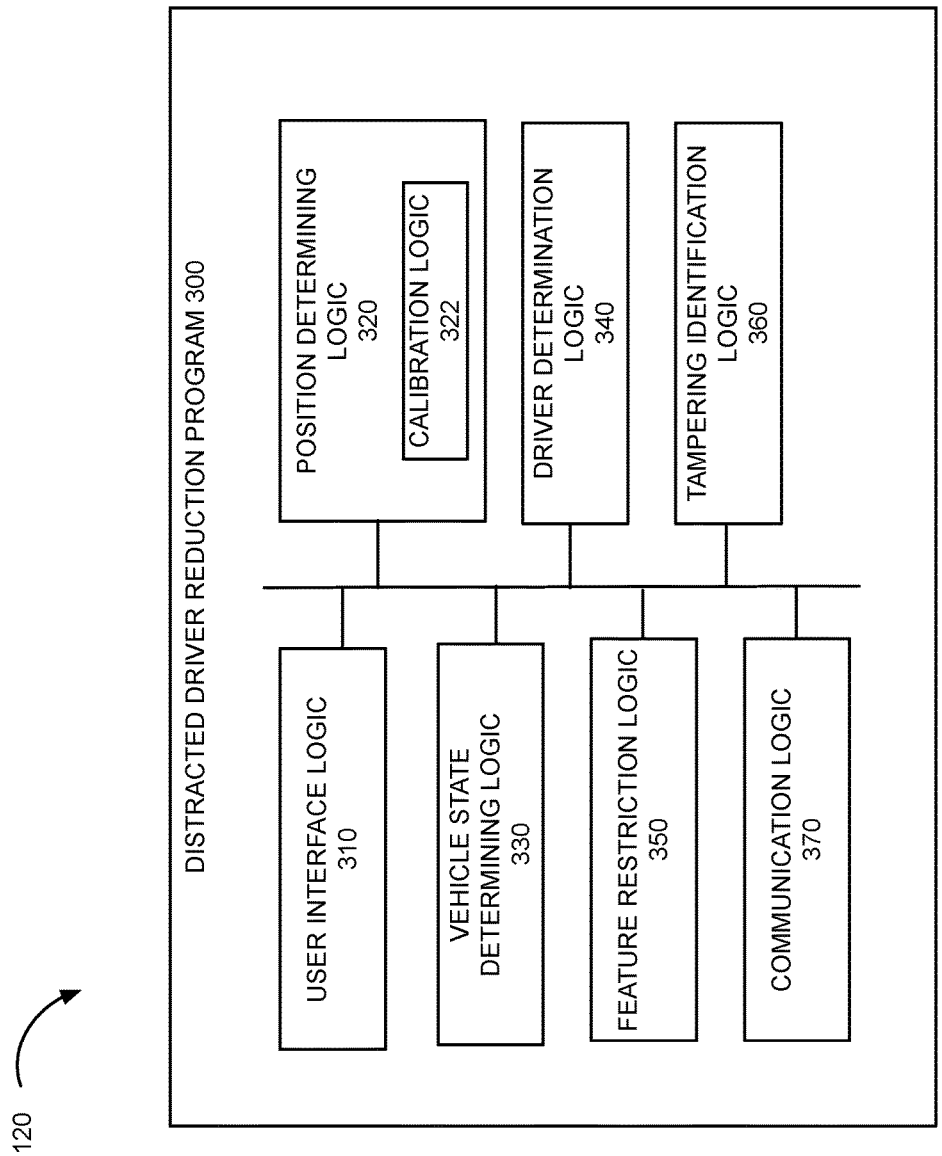
FIG. 3 illustrates an exemplary configuration of logic components implemented in the user device of FIG. 1.

FIG. 3 is an exemplary functional block diagram of components implemented in user device 120 of FIG. 1. Referring to FIG. 3, distracted driving reduction program 300 may be an application program associated with monitoring usage of user device 120 with respect to vehicle 110. Distracted driving reduction program 300 may include software instructions executed by processor 220 stored in memory 230 of user device 120. In alternative implementations, these components or a portion of these components may be located externally with respect to user device 120, such as vehicle interface device 140.

As shown in FIG. 3, distracted driving reduction program 300 may include user interface logic 310, position determining logic 320, vehicle state determining logic 330, driver determination logic 340, feature restriction logic 350, tampering identification logic 360, and communication logic 370. User interface logic 310 may include logic to facilitate launching application 300. For example, user interface logic 310 may include a graphical user interface (GUI) that allows a user to instruct distracted driving reduction program 300 to operate as a background process while user device 120 is turned on. In other implementations, a user may select to automatically execute distracted driving reduction program 300 when he/she is getting close to vehicle 120. In this case, distracted driving reduction program 300 may communicate with vehicle interface device 140 when user device 120 is brought within relatively close proximity (e.g., 10 feet, 20 feet etc.) to vehicle 110. In some implementations, distracted driving reduction program 300 may be part of a larger program that allows user device 120 to interface with vehicle interface device 140 to obtain and display information of interest regarding operation of vehicle 110, such as speed information, vehicle health information, vehicle location tracking information, hard acceleration and braking information, etc.

Position determining logic 320 may include logic that monitors environment 100 for the presence of beacons 130 and, when one or more beacons 130 are detected, determines a likely position of user device 120 within vehicle 110. For example, position determining logic 320 may include or may utilize a receiver or antenna that detects signals emitted/broadcast by beacons 130. As described briefly above, beacons 130 may be configured to periodically output an advertising signal that includes the beacon's identification and RSSI values. Position determining logic 320 may be configured to detect or observe the advertising signals from beacons 130 and may ascertain a signal strength value for each received signal. Based on the relative signal strengths and RSSI values for each beacon 130, position determining logic 320 may determine a likely position of user device 120 within vehicle 110, via, for example, triangulation techniques.

As shown in FIG. 3, in some implementations, position determining logic 320 may include calibration logic 322 that includes logic to enable distracted driving reduction program 300 to learn positions of user device 120. For example, via user interface logic 310, calibration logic 322 may request that a user move user device 120 to various specific locations within vehicle 110, such as positions along the dashboard (e.g., far left side of dashboard, center of dashboard, etc.), between the front seats, adjacent the door handles, etc. By recording beacon signal strength values at the predefined locations, calibration logic 322 may allow position determining logic 320 to account for variations in interior dimensions or positions of beacons 130 that may affect the accuracy of position determining logic 320.

Consistent with one implementation described herein, calibration logic 322 may store values corresponding to baseline positioning of beacons 130 in vehicle. For example, beacons 130 may include accelerometers that relay position information (e.g., X/Y/Z axis values) in advertising signals. Calibration logic 322 may store the position information for beacons 130 as recorded during setup. In some implementations, distracted driving reduction program 300 may periodically determine changes in the position of beacons 130 by comparing received accelerometer values to the baseline information stored by calibration logic 322. As described below, this information may be used to determine whether one or more beacons 130 have been moved subsequent to calibration.

Vehicle state determining logic 330 may include logic for determining an operating state of vehicle 110. In some embodiments, the operating state of vehicle 110 may be determined via notifications or signals received from vehicle interface device 140. In such an implementation, vehicle interface device 140 may be configured to periodically transmit operation state information received from a vehicle 110's VES to user device 120, via, e.g., BLE. Exemplary operation states may include whether the ignition is on or off (e.g., key on; key off); the speed of the vehicle, the revolutions per minute of the vehicle engine, etc. In other embodiments, vehicle state determining logic 330 may determine the state of the vehicle using sensors integrated within user device 120, such as global position system (GPS), an accelerometer, etc.

Driver determination logic 340 may include logic to determine a likelihood that user device 120 is being operated by the driver of vehicle 110, based on the determinations of position determining logic 320 and vehicle state determining logic 330. For example, when position determining logic 320 determines that user device 120 is in the vicinity of the driver's seat and vehicle state determining logic 330 determines that the vehicle is operating (e.g., moving, etc.), driver determination logic 340 may determine that the user device 120 is being operated by the driver of vehicle 110.

Feature restriction logic 350 may include logic to eliminate or restrict one or more functions of user device 120 (or even disable user device 120 entirely) when driver determination logic 340 determines that user device 120 is being operated by the driver of vehicle 110. For example, feature restriction logic 350 may deactivate certain features, such as calling, text messages, or social network applications, while retaining the functionality of other features, such as navigation applications, music applications, etc.

Consistent with embodiments described herein, feature restriction logic 350 may be customizable by a user or account holder associated with user device 120, such as a parent of the driver or a company representative associated with vehicle 110. Furthermore, in some embodiments, feature restriction logic 350 may interface with service provider 150 to affect the requested feature restrictions. For example, feature restriction logic 350 may instruct service provider 350 to disable communications to/from user device 120 while user device is being operated by the driver (as determined by driver determination logic 340). In other embodiments, such instructions may allow for emergency communications, such as voice calls or text messages to 911, communications to parental account holders, fleet or dispatch representatives, etc., via user device 120. In some implementations, access to emergency-based communications may be impacted by the operating condition of the vehicle, such as air bag conditions, tire pressure conditions, etc., which may be relayed from vehicle interface device 140 to user device 120.

Tampering identification logic 360 may include logic for determining whether one or more of beacons 130 or vehicle interface device 140 have been tampered with or removed following calibration by calibration logic 322. For example, to circumvent distracted driving reduction program 300 following calibration (e.g., by a parent, etc.), a user may attempt to reposition beacons 130 such that position determining logic 320 is unable to correctly determine when user device 120 is being operated by the driver. To detect such tampering, tampering identification logic 360 may receive relative distance information from beacons 130 and may compare the received information to the original distance information obtained during calibration. When a difference greater than a threshold is determined, distracted driving reduction program 300 may transmit a message or notification to an account holder or may automatically activate feature restriction logic 350, as described above.

Consistent with other implementations, beacons 130 may include an accelerometer and may report accelerometer values in their advertising signals (e.g., values corresponding to the pull of gravity in each of the X, Y, and Z axes). As the orientation and position of one or more beacons 130 change, the X/Y/Z values will also change. In such an implementation, tampering identification logic 360 may compare the received accelerometer values for beacons 130 and, when one or more of the values differs from the other received values or from baseline values (as described above), tampering identification logic 360 may determine that the corresponding beacon 130 is being moved or repositioned. When such movement is determined, distracted driving reduction program 300 may transmit a message or notification to an account holder/vehicle owner or may activate feature restriction logic 350 described above. Consistent with embodiments described herein, the accelerometer values may be averaged with an algorithm to negate the accelerations induced by driving the vehicle and filtering out any false tampering indications.

Communication logic 370 may include logic for communicating with other devices in environment 100. For example, communication logic 370 may receive and/or transmit information from vehicle interface device 140, etc.

Although FIG. 3 shows exemplary components of distracted driving reduction program 300, in other implementations, distracted driving reduction program 300 may include fewer components, different components, differently arranged components, or additional components than depicted in FIG. 3. For example, as described above, distracted driving reduction program 300 may be part of a larger program that allows user device 120 to interface with vehicle interface device 140 to obtain and display information of interest regarding operation of vehicle 110. In addition, functions described as being performed by one or more of the components in FIG. 3 may alternatively be performed by another one or more of the components of distracted driving reduction program 300.

Figure 4:
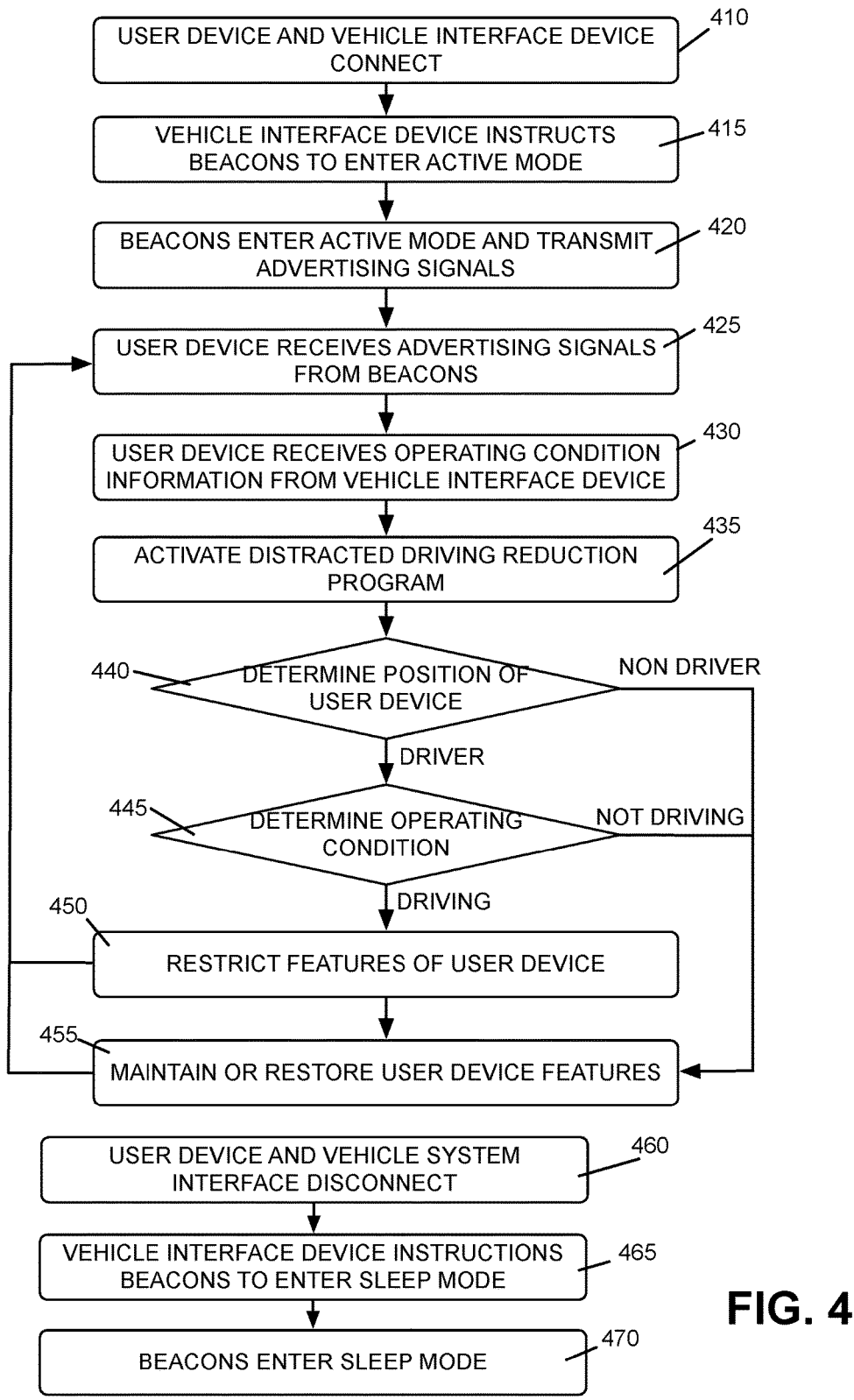
FIG. 4 is a flow diagram illustrating processing by various components illustrated in FIGS. 1-3 in accordance with an exemplary implementation.

FIG. 4 is a flow diagram illustrating processing associated with elements of environment 100. The flow diagram of FIG. 4 is described in conjunction with the signal flow diagram of FIG. 5. Processing may begin with vehicle interface device 140 determining that user device 120 is within a predetermined proximity (block 410; signal 510). For example, user device 120 may periodically broadcast or emit an advertising signal to vehicle interface device 140 via BLE. Since user device 120 and vehicle interface device 140 have been previously paired or associated with each other, vehicle interface device 140 may recognize user device 120. In response, vehicle interface device 140 may transmit an enter active state message to beacons 130 via BLE (block 415; signal 515) that instructs beacons 130 to send advertising messages at an operational rate, which is faster than the advertising rate when beacons 130 are in the sleep mode. In response, beacons 130 may enter active mode and may begin transmitting advertising signals at periodic intervals (e.g., approximately 100 ms) (block 420; signals 520).

User device 120 may receive the advertising signals 520 from beacons 130 (block 425) and operating condition information (Key On Signal 525) from vehicle interface device 140 (e.g., via BLE) (block 430). For example, vehicle state determining logic 330 may receive the operating condition information and, based on the content of the information, may ascertain whether vehicle 110 is being operated in a manner in which distracted driving should be restricted. As described above, operating condition information may be received or acquired from vehicle 110 (e.g., one or more VESs) by vehicle interface device 140. Although a "Key On" signal is depicted in FIG. 5, different indications of vehicle operating condition may be used, such as the vehicle's speed, acceleration, transmission gear, etc.

User device 120, upon receipt of beacon signals 520 may activate distracted driving reduction program 300 (block 435), which may be running as a background process or may be initiated upon receipt of signals from vehicle interface device 140 and/or beacons 130.

User device 120 may determine a position of user device 120 within vehicle 110 based on the content of the advertising signals (block 440). For example, as described above, position determining logic 320 may ascertain (e.g., via triangulation, etc.) a location of user device 120 based on measured signal strengths, advertised RSSI values, and/or known position information for each of beacons 130. In some additional implementations, additional information and/or components may be used to assist in determining the position of user device 120. For example, one or more camera devices, seat pressure sensors, microphones, etc. may be used to complement the initial position determination based on beacon advertising signals.

If position determining logic 320 determines that the position of user device 120 is other than a position reachable by a driver (block 440—non-driver), processing may continue to block 455 described below or may return to block 425 for a subsequent measurement interval. However, if position determining logic 320 determines that the position of user device 120 is a position reachable by the driver (block 440—driver), processing continues to block 445, where it is determined whether vehicle 110 is being operated in a manner in which driver device usage is to be restricted. For example, vehicle state determining logic 330 may receive the vehicle operating condition information from vehicle interface device 140 and may determine based thereon (block 445—not driving) that vehicle 110 is not being operated in a manner received in which driver device usage is to be restricted, such conditions may include when the key is off, the car is in park, the speed is zero, etc. For example, service provider 150 may block or prevent all communications (or all user-directed communications) to and from user device 120.

However, when vehicle state determining logic 330 determines (block 445—driving) that vehicle 110 is being operated in a manner received in which driver device usage is to be restricted, processing proceeds to block 450, and device features may be restricted. For example, feature restriction logic 350 may deactivate certain features or cause (e.g., via service provider 150) such features to be restricted or deactivated. Exemplary features to be restricted may include voice calling, video calling, text messaging, social media applications, etc. In some implementations, feature restriction logic 350 may notify service provider 150 that user device 120 is being operated by a vehicle driver, and service provider 150 may restrict certain types of network access or capabilities. In one implementation, user device 120 may be completely deactivated (turned off).

When it is determined that either user device 120 is not in a position reachable by a driver (block 440—non driver) or that the vehicle operating state is not one in which driver device usage is to be restricted (block 445—not driving; Key Off Signal 530), device functionality may be maintained or restored (block 455).

It should be understood that the processing of blocks 440-455 are continually updated based on information received from beacons 130 and/or vehicle interface device 140, as represented by recursion arrows in FIG. 4. In some embodiments, distracted driving reduction program 300 may include a refractory or predetermined period during which modifications in feature functionality may be prevented. Such a period may be on the order of 5-10 seconds, to avoid a ping pong effect in which features are repeatedly deactivated and activated. Consistent with such an embodiment, circumstances that indicate either non-driving or non-driver conditions must persist for at least the refractory period to cause reactivation or restoration of previously restricted features.

At block 460, vehicle interface device 140 may determine that user device 120 is no longer within proximity of vehicle 110 (disconnect BLE signal 535). For example, vehicle interface device 140 may cease receiving advertising signals from user device 120. In response, vehicle interface device 140 may transmit an enter sleep mode message to beacons 130 via BLE (block 465; signal 540) that instructs beacons 130 to send advertising messages at a slower rate relative to the active mode. In response, beacons 130 may enter the sleep mode and may begin transmitting advertising signals at slower periodic intervals (e.g., approximately 1-2 s) (block 470; signals 545).

Implementations described herein provide the ability to restrict or prevent operation of a user device when it is determined that a user of the user device is operating a motor vehicle, such as a car, truck, bus, train, boat, etc. Such functionality may find particular applicability for younger (teenage) and commercial drivers in which the owner or account holder of the user device has a supervisory role with respect to the user of the user device. As described above, a smart phone application executing on the user device is configured to communicate with a vehicle interface device and a plurality of spaced apart beacon devices positioned within a passenger compartment of the motor vehicle. Using information received from both the beacons and the vehicle interface device, the smart phone application is able to determine whether the user of the user device is driving the vehicle and, if so, facilitate restriction or deactivation of one or more functions of the user device, such as messaging, phone calls, etc. Once the smart phone application determines that either the user device is not being used by the driver, or that the motor vehicle is not being driven (e.g., in park, key off, etc.), device functionality may be restored.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to user device 120 detecting communicating with vehicle interface device 140 to determine an operational state of vehicle 110. In other implementations, user device 120 may determine an operational state of vehicle 110 without receiving information from vehicle interface device 140, such as via its own accelerometers or GPS components.

Furthermore, in some implementations, one or more of vehicle interface device 140 or user device 120 may store or track the determined position of user device 120 within the passenger compartment of vehicle 110. The stored information may be periodically transmitted to a different user device (e.g., a parent or account holder's device) either directly or via service provider 150. The stored information may include indications of instance in which device functionality has been restricted. In still other embodiments, distracted driver reduction program 300 may be configured to transmit indications of device restriction to an account holder in substantially real time, either directly (via in-app messaging, email, automated text message, etc.), or via service provider 150.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks have been described with respect to the flow diagram of FIG. 4 and the signal flow of FIG. 5, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices. Furthermore, as used herein, the terms assembly or component are intended to be broadly construed as hardware, firmware, or a combination of hardware and software.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    receiving, by a mobile device, signals periodically output by a plurality of beacon devices,
    wherein the beacon devices are positioned at known locations within a motor vehicle interior,
    receiving, by the mobile device, vehicle operating condition information from a vehicle interface device operatively coupled to one or more electronic systems of the motor vehicle;
    determining, by the mobile device, a position of the mobile device within the motor vehicle interior based on the received signals;
    determining, by the mobile device, whether a user of the mobile device is a driver of the motor vehicle based on the position of the mobile device and the vehicle operating condition information;
    restricting one or more features of the mobile device when it is determined that the user of the mobile device is the driver of the motor vehicle;
    determining whether positioning of one or more of the plurality of beacon devices has been modified following initial setup of the plurality of beacon devices;
    determining that the one or more of the plurality of beacon devices have been tampered with when it is determined that the positioning of one or more of the plurality of beacon devices has been modified; and
    performing at least one of the restricting of one or more features of the mobile device or notifying an account holder of the mobile device of the tampering when it is determined that the one or more of the plurality of beacon devices have been tampered with, regardless of the determined position of the mobile device within the interior of the motor vehicle.

2. The method of claim 1, wherein the plurality of beacon devices comprise at least four beacon devices and wherein the known locations within the motor vehicle are distributed within the motor vehicle interior.

3. The method of claim 1, wherein the signals comprise at least identification information and calibrated signal strength information, the method further comprising:
    determining a received signal strength for each of the signals; and
    determining the position of the mobile device is based on the calibrated signal strength information and the received signal strength for each of the plurality of beacon devices.

4. The method of claim 3, further comprising:
    calibrating the user device to establish received signal strength values for each of the signals when the mobile device is at a plurality of predefined positions within the motor vehicle interior.

5. The method of claim 1, wherein the vehicle operating condition information comprises at least one of: key on, key off, vehicle speed, vehicle acceleration, or engine speed.

6. The method of claim 1, wherein the vehicle interface device comprises an accessory coupled to a diagnostic port on the motor vehicle.

7. The method of claim 1, further comprising:
determining, by the vehicle interface device, that the mobile device is in proximity to the motor vehicle;
establishing, by the vehicle interface device, a wireless connection with the mobile device when it is determined that the mobile device is in proximity to the motor vehicle; and
instructing, by the vehicle interface device, the plurality of beacon devices to enter an active mode of operation when it is determined that the mobile device is in proximity to the motor vehicle,
wherein, when in the active mode of operation, the plurality of beacon devices transmit the advertising signals at an operational rate.

8. The method of claim 7, further comprising:
determining, by the vehicle interface device, that the mobile device is no longer in proximity to the motor vehicle; and
instructing, by the vehicle interface device, the plurality of beacon devices to enter a sleep mode of operation when it is determined that the mobile device is no longer in proximity to the motor vehicle,
wherein, when in the sleep mode of operation, the plurality of beacon devices transmit the advertising signals at a sleep rate that is slower than the operational rate.

9. The method of claim 8, wherein the operational rate is approximately 100 milliseconds or less and the sleep rate ranges from one to two seconds.

10. The method of claim 1, wherein the signals comprise advertising signals transmitted in accordance with Bluetooth low energy protocol.

11. The method of claim 1, further comprising:
transmitting a notification to a service provider of the mobile device when it is determined that the user of the mobile device is the driver of the motor vehicle; and
restricting, by the service provider, the one or more features of the mobile device based on the notification.

12. The method of claim 1, further comprising:
removing restrictions of the one or more features of the mobile device when it is determined that the user of the mobile device is not the driver of the motor vehicle.

13. A system, comprising:
a mobile device;
a plurality of beacon devices positioned at known locations within a motor vehicle interior; and
a vehicle interface device operatively coupled to one or more electronic systems of the motor vehicle,
wherein the plurality of beacon devices are configured to periodically transmit signals,
wherein the mobile device is configured to:
receive the signals from the plurality of beacon devices;
receive vehicle operating condition information from the vehicle interface device;
determine a position of the mobile device within the motor vehicle interior based on the received signals;
determine whether a user of the mobile device is a driver of the motor vehicle based on the position of the mobile device and the vehicle operating condition information;
restrict one or more features of the mobile device when it is determined that the user of the mobile device is the driver of the motor vehicle;
determine whether positioning of one or more of the plurality of beacon devices has been modified following initial setup of the plurality of beacon devices;
determine that the one or more of the plurality of beacon devices have been tampered with when it is determined that the positioning of one or more of the plurality of beacon devices has been modified; and
perform at least one of the restricting of one or more features of the mobile device or notifying an account holder of the mobile device of the tampering when it is determined that the one or more of the plurality of beacon devices have been tampered with, regardless of the determined position of the mobile device within the interior of the motor vehicle.

14. The system of claim 13, wherein the plurality of beacon devices comprise at least four beacon devices and wherein the known locations within the motor vehicle are distributed within the motor vehicle interior.

15. The system of claim 13, wherein the vehicle interface device comprises an accessory coupled to a diagnostic port on the motor vehicle.

16. The system of claim 13, wherein the vehicle interface device is further configured to:
determine that the mobile device is in proximity to the motor vehicle;
establish a wireless connection with the mobile device when it is determined that the mobile device is in proximity to the motor vehicle;
instruct the plurality of beacon devices to enter an active mode of operation when it is determined that the mobile device is in proximity to the motor vehicle,
wherein, when in the active mode of operation, the plurality of beacon devices transmit the signals at an operational rate;
determine that the mobile device is no longer in proximity to the motor vehicle; and
instruct the plurality of beacon devices to enter a sleep mode of operation when it is determined that the mobile device is no longer in proximity to the motor vehicle,
wherein, when in the sleep mode of operation, the plurality of beacon devices transmit the signals at a sleep rate that is slower than the operational rate.

17. The system of claim 13, further comprising:
a service provider device connected to one or more of the mobile device or the vehicle interface device,
wherein the mobile device is configured to notify the service provider device when it is determined that the user of the mobile device is the driver of the motor vehicle, and
wherein the service provider device is configured to perform restricting of the one or more features of the mobile device based on the notification.

18. A non-transitory computer-readable medium having stored thereon sequences of instructions which, when executed by at least one processor, cause the at least one processor to:
receive signals periodically output by a plurality of beacon devices,
wherein the beacon devices are positioned at known locations within a motor vehicle interior,
receive vehicle operating condition information from a vehicle interface device operatively coupled to one or more electronic systems of the motor vehicle;
determine a position of a mobile device within the motor vehicle interior based on the received signals;
determine whether a user of the mobile device is a driver of the motor vehicle based on the position of the mobile device and the vehicle operating condition information;

restrict one or more features of the mobile device when it is determined that the user of the mobile device is the driver of the motor vehicle;

remove restrictions of the one or more features of the mobile device when it is determined that the user of the mobile device is not the driver of the motor vehicle;

determine whether positioning of one or more of the plurality of beacon devices has been modified following initial setup of the plurality of beacon devices;

determine that the one or more of the plurality of beacon devices have been tampered with when it is determined that the positioning of one or more of the plurality of beacon devices has been modified; and perform at least one of the restricting of one or more features of the mobile device or notifying an account holder of the mobile device of the tampering when it is determined that the one or more of the plurality of beacon devices have been tampered with, regardless of the determined position of the mobile device within the interior of the motor vehicle.

19. The non-transitory computer-readable medium of claim 18, wherein the non-transitory computer-readable medium is stored in the mobile device, wherein the signals comprise at least identification information and calibrated signal strength information, and wherein the instructions further cause the at least one processor to:

determine a received signal strength for each of the plurality of signals; and determine the position of the mobile device is based on the calibrated signal strength information and the received signal strength information for each of the plurality of beacon devices.

* * * * *